United States Patent
Bellante (10) Patent No.: US 8,682,484 B2
(45) Date of Patent: Mar. 25, 2014

(54) METHOD FOR ANTI-COLLISION CONTROL AND THE MANAGEMENT OF PICKING DEVICES WITH SHARED WORKING AREAS IN A PACKAGING LINE

(71) Applicant: CAMA1 S.p.A., Milan (IT)

(72) Inventor: Daniele Bellante, Garbagnate Monastero (IT)

(73) Assignee: Cama1 S.p.A., Milan (IT)

( * ) Notice: Subject to any disclaimer, the term of this patent is extended or adjusted under 35 U.S.C. 154(b) by 0 days.

(21) Appl. No.: 13/667,452

(22) Filed: Nov. 2, 2012

(65) Prior Publication Data

US 2013/0173051 A1 Jul. 4, 2013

(30) Foreign Application Priority Data

Dec. 30, 2011 (EP) .................................. 11196187

(51) Int. Cl.
*G06F 7/00* (2006.01)
(52) U.S. Cl.
USPC ........... 700/230; 700/213; 700/215; 700/216; 700/217; 700/214; 53/474; 53/475
(58) Field of Classification Search
None
See application file for complete search history.

(56) References Cited

U.S. PATENT DOCUMENTS

| | | | |
|---|---|---|---|
| 4,976,582 A | | 12/1990 | Clavel |
| 6,122,895 A | * | 9/2000 | Schubert ........................... 53/55 |
| 6,505,093 B1 | * | 1/2003 | Thatcher et al. ............. 700/216 |
| 2006/0042914 A1 | | 3/2006 | Wiedemann et al. |
| 2007/0108109 A1 | * | 5/2007 | Erlandsson-Warvelin et al. .............................. 209/629 |
| 2009/0299521 A1 | * | 12/2009 | Hansl et al. ................... 700/215 |
| 2010/0242415 A1 | * | 9/2010 | Ehrat et al. ....................... 53/474 |

FOREIGN PATENT DOCUMENTS

EP 2233400 9/2010

OTHER PUBLICATIONS

Hebert et al. "A robotic gripper system for limp material manipulation: Hardware and software development and integration", Robotics and Automation, 1997. Proceedings.., 1997 IEEE International Conference on Albuquerque, NM, USA, Apr. 20-25, 1997, IEEE New York, NY, USA, vol. 1, Apr. 20, 1997, pp. 15-21 XP010235669, p. 15-p. 21.
European Search Report from European Application No. EP 11196187 dated Aug. 13, 2012.

* cited by examiner

*Primary Examiner* — Yoland Cumbess
(74) *Attorney, Agent, or Firm* — Dorsey & Whitney LLP (57) ABSTRACT

Methods for anti-collision control of pickers in a packaging line are disclosed. The line includes linear conveyors for the inlet of items and for the outlet of items, robots or picking devices that operate with shared working areas. The anti-collision method comprises an algorithm to assign a pickup location or a delivery location to a generic first robot including: checking for a pickup or delivery location already assigned to other robots and in a working area shared with the first robot; dynamically redefining the working area of the first robot to obtain a new working area such that the locations already assigned to other robots are outside of the dynamically-redefined area; assigning of a respective pickup or delivery location belonging to the redefined working area to the first robot. A prediction algorithm is disclosed to improve management of items and balancing of work load between the robots.

12 Claims, 6 Drawing Sheets

METHOD FOR ANTI-COLLISION CONTROL AND THE MANAGEMENT OF PICKING DEVICES WITH SHARED WORKING AREAS IN A PACKAGING LINE

TECHNICAL FIELD

Embodiments of the present invention relate to packaging machines. Embodiments of the invention concern an anti-collision control system for packaging machines comprising a plurality of manipulators or robots with shared working areas.

BACKGROUND

The prior art comprises packaging lines equipped with two or more picking devices, also called pickers. Said devices or pickers can be represented for example by robots with two or more degrees of freedom. A suitable robot for these applications is for example the delta robot known from U.S. Pat. No. 4,976,582.

The task of said picking devices is to pick items from at least one inlet conveyor and transfer them into a predetermined location on at least one second outlet conveyor. Normally, bulk products are carried by the inlet conveyor with a well-ordered or a random arrangement, depending on the production cycle; the outlet conveyor carries a series of containers or boxes adapted to receive one or more items each.

The picking devices are often located above the conveyors, which is commonly referred to as top-loading arrangement.

Operations carried out by a picking device are called missions. Hence, picking missions and delivery missions are defined. A picking mission comprises picking an item, or many items as the case may be, from one location or several locations of the first inlet conveyor. A delivery mission comprises delivery of item or items (picked in a previous mission) in a desired location of the second outlet conveyor, for example inside a container.

In the following description, the term "robot" will be used for conciseness to indicate the picking devices. The term robot shall be intended to mean a device suitable for picking and delivering the items.

The missions are governed by a control system. In basic terms, the control system has at any time a certain number of picking locations and a certain number of delivery locations. Said picking and delivery locations are predetermined or dynamically detected for example with a viewing system. The control system continuously receives "requests" from the robots: for example a free robot issues a request for a picking mission, whereas a robot holding an article, just after execution of a picking mission, issues a delivery request.

The control system is substantially a manager of said requests, and allocates respective pickup locations, or delivery locations, to the robots. The criteria for allocation may include: picking all the incoming items; filling all locations of the second conveyor, according to the required format, avoiding gaps in the output; reducing waiting time of the robots. The pickup locations correspond to the locations (coordinates) of the items; the delivery locations correspond for example to free spaces inside containers.

Each of the robots operates inside its own working area, which corresponds to a region of the first and second conveyor, respectively, the robot is physically able to reach with its gripping member.

In the prior art, the robots are spaced apart so that the respective working areas have no point in common. The absence of shared working areas simplifies the control but results in some drawbacks including a longer and/or wider packaging line. Moreover, the working areas are usually roughly circular; in other words the areas are defined by circles without points in common or at most tangent. Said configuration generates relatively large "dark" areas around the points of tangency, which cannot be reached by any of the robots.

Large dark areas have a negative effect on the rate of occupation of the robots, because a free item or a free delivery location, while passing through a dark area, cannot be allocated to any robot. As each robot operates exclusively in its own working area, such an arrangement is also less adaptive to fluctuations of the feed, i.e. to fluctuations of the number of incoming items per minute. In such conditions some robots of the line are full- or even over-loaded, whilst other robots are underutilized. This problem is also suffered during a transient, for example start-up of the line or stop/start of an upstream machine that delivers the items.

In order to overcome these limitations, there is a need to bring robots closer to each other, thus bringing the respective working areas to partially overlap one another and creating one or more shared working areas. Shared working areas are defined as regions of the first conveyor and/or of the second conveyor where at least two different robots can operate. This realization, however, needs an anti-collision control.

Known anti-collision control systems in the field of robotics have been developed substantially for safety purposes, to avoid damage of the robots or to avoid interference of a robot with fixed structures or human beings in the vicinity. Basically, said anti-collision systems intervene when a moving part of the robot enters a forbidden area. Said systems however are not satisfactory for application to packaging lines, since they do not allow optimisation of performance and, notably, they do not solve the problem of how to allocate the picking or delivery missions. The above mentioned requirements, including the picking of all incoming items, completion of outgoing packages, and balancing of the load between the robots, require to set suitable criteria for management of several picking devices (robots) with shared areas. This need becomes increasingly stringent as the market requires packaging machines capable of high flows [number of items/min] and adaptable to the change of format.

The prior art does not provide a satisfactory solution. It is still preferred to configure robots with separate working areas or at most tangent working areas. This is a simple solution since it is sufficient to configure each robot with a set of coordinates that define its working area, substantially independently from the working areas of the other robots. However, it suffers the above mentioned drawbacks.

SUMMARY

The problem underlying one or more embodiments of the invention is to provide an algorithm which is usable to control picking devices in a packaging machine of the type considered here, the algorithm being able to: i) prevent the collision between picking devices in shared working areas, and ii) optimise the allocation of picking or delivery missions, respectively, so as to maximise the rate of occupation of the picking devices and optimise performance.

The problem is solved with a method for anti-collision control in a packaging line. The method provides to dynamically redefine the working area of a generic picking device, as a function of the missions in progress by other devices that share the working area with the generic device. The working area thus recalculated can be equivalent to the nominal (maximum) working area of the generic device, or can be smaller than the nominal working area, due to temporarily exclusion of a region which is occupied by a mission of another device.

The method provides an algorithm for allocation of picking or withdrawal locations to a picking device, which preferably is a robot. In some embodiments of the invention, a general control system (also called manager) that coordinates the different devices, allocates the locations (pick-up or delivery locations, respectively); the related mission is generated by the local control system of the picking device that receives a pickup location or a delivery location from the manager.

The dynamic redefinition of the working area can be carried out for example by shifting a border of the working area. In some embodiments of the invention, the working area which can be reached by a picking device, on a specific conveyor, corresponds to a region of the same conveyor comprised between a lower limit and an upper limit. The terms lower and upper refer to the conveying direction, the lower limit being downstream and the upper limit being upstream, with respect to the conveying direction.

The dynamic-redefinition algorithm is carried out before assigning a location in a shared area, and for all devices that share working areas. The method therefore prevents collisions in the shared working areas.

In a preferred embodiment, the algorithm comprises the steps of:
  identifying a preferred pickup or delivery location, inside the working area of a generic first picking device,
  dynamically redefining the working area of the first device obtaining an admissible working area,
  allocating the preferred location to the first device, if the location is comprised in the admissible working area, or
  seeking a new available picking or delivery location in the dynamically-redefined admissible working area, and allocating the new location, if existing, to the first picking device.

If no picking or delivery location can be allocated, the picking device is made to wait.

A more preferred embodiment of the invention also comprises a second algorithm which is termed prediction algorithm, which gives priority to the downstream device for allocation of picking or delivery locations available in shared areas. The order of the picking devices, from upstream to downstream, is defined by the conveying direction of the items.

In accordance with the prediction algorithm, a location available to a N-th generic device is assigned with priority to a (N−1)-th device downstream, whenever possible, if the location is found in a shared area accessible to both of the N-th and (N−1)-th picking devices.

In a preferred embodiment the method also comprises a third position control algorithm that generates a collision alarm if the mutual distance between picking devices, or between one picking device and another component of the packaging line, or of the outside world, falls below a predetermined threshold. The third algorithm implements a safety position control; it generates an alarm if a picking device or a part thereof enters into a forbidden area or if the minimum distance between two devices is below a safety threshold. The algorithm is, however, a precautionary measure and usually will not intervene, the collision being actually prevented by the first algorithm for dynamic definition of the working areas.

It should be noted that the method of the invention is equally applicable to the picking locations and to the delivery locations. Therefore, any reference in the description to a picking location or mission can equally be applied to delivery location or mission, and vice-versa.

The method and related algorithms can be implemented with a known programming language, for example according to standards for the programming of industrial robots. An example of applicable language is the known CoDeSys language. An object-oriented programming language is preferred; for example, a robot is treated in the program as an instance of a class that contains the number and location of the other robots of the line, and particularly of nearby robots sharing the working area. In this way, the program can be easily parameterized and can be adapted to different lines, for example with parallel conveyors, cross flow type, etc. Advantageously, a unique coordinate system is defined and is the same for all picking devices.

Another aspect of the invention consists of a packaging line. The packaging line comprises a control and management system of the picking devices, which implements the method for anti-collision and assignment of pick-up and delivery locations from/on the respective conveyors, according to any one of the embodiments described here.

The terms of inlet or outlet conveyor, respectively, shall be referred to one or more linear transportation devices, for example conveyor belts. In some embodiments the conveyors are substantially parallel, having the same conveying direction in a concurrent arrangement, or opposite conveying direction in a counter-current arrangement. In other embodiments an outlet conveyor is perpendicular to an inlet conveyor; the embodiments are named cross-flow embodiments. Both the inlet conveyor and the outlet conveyor can physically consist of a single conveyor or several conveyors.

The picking devices are advantageously arranged above the conveyors (top loading); they are preferably industrial robots with at least two degrees of freedom; more preferably they are parallel robots like for example the known delta robot.

The items can be of various kinds. A preferred application consists of use in primary or secondary packaging lines, in which the items represent products (bulk products or products already packed in primary packaging) to be loaded inside containers on the second conveyor.

The advantages of one or more embodiments of the invention comprise: high rate of occupation of the robots or picking devices, thanks to the close layout with shared areas; compact size of the line; reduction of "dark" areas out of reach for the robots, with respect to layouts with separate working areas; possibility to make a compact machine even with a cross-flow arrangement, i.e. with the outlet direction perpendicular to the feeding direction.

The prediction algorithm has the advantage of further improving the efficiency of emptying the inlet conveyor and filling the outlet conveyor, or the containers transported by the outlet conveyor; moreover, it reduces the waiting times of picking devices waiting for allocation of a new pick-up or delivery location. The advantages derive from the fact that more useful locations are normally available to an upstream device, because the density of items (or of delivery locations, respectively) is the maximum. The number of available locations, in other words, tends to decrease from upstream to downstream, as the items pass from the first conveyor to the second conveyor or the respective containers. The priority given to the downstream devices, therefore, improves the balancing of the workload.

The advantages will become even clearer with the help of the following description and the figures, which represent an indicative and not limiting example.

DETAILED DESCRIPTION

Figure 1:
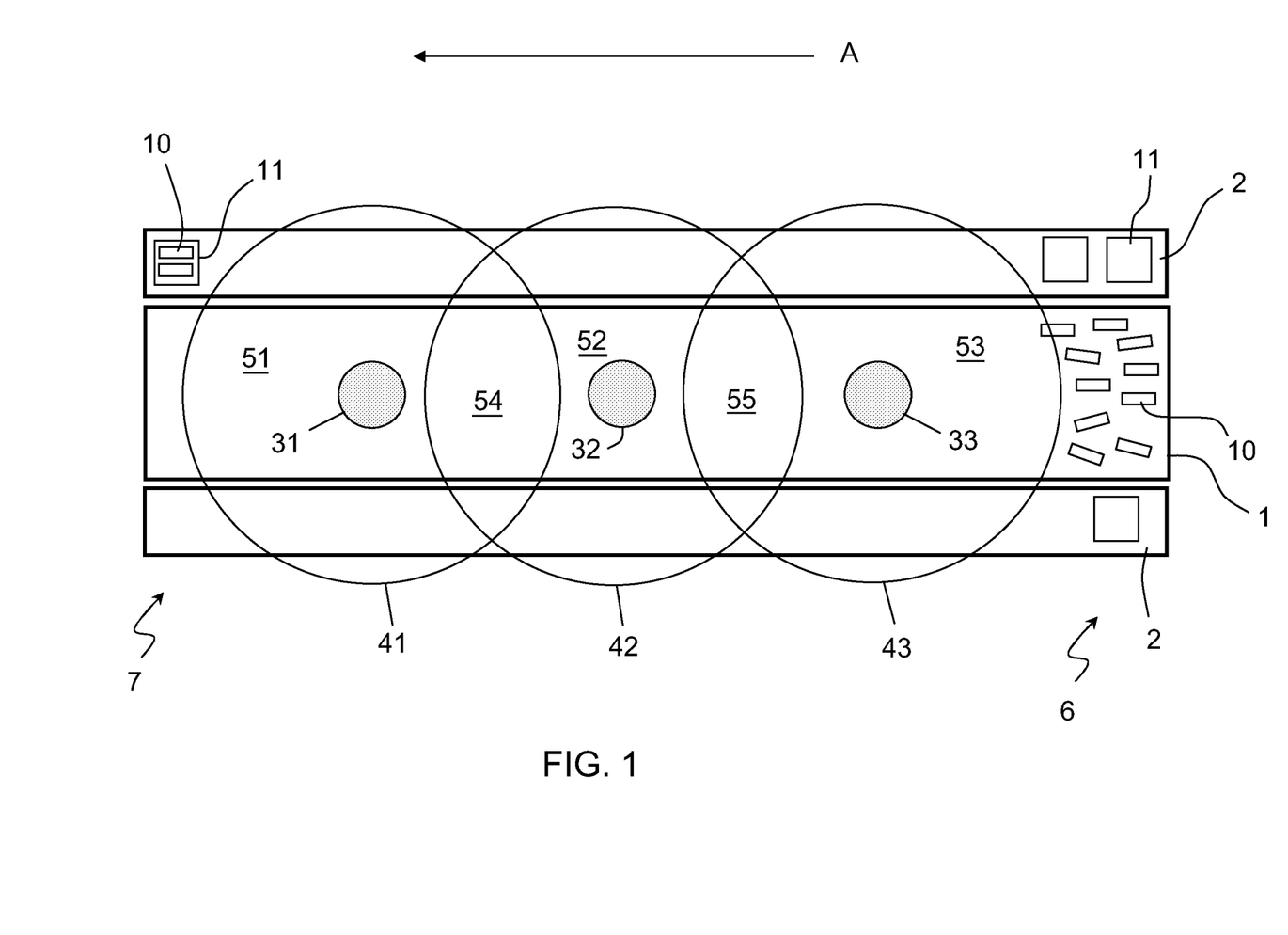
FIG. 1 is a diagram of a packaging line with robots having shared working areas, in which embodiments of the invention can be applied.

FIG. 1 is a scheme of a packaging line, in particular a robotized line for loading items 10 inside containers 11.

The line comprises a conveyor 1 for the items 10 and a conveyor 2 for transportation of the containers 11. In the example there is a conveyor belt for the items with two side belts that transport the containers 11. The picking devices are represented by parallel robots 31, 32, 33 mounted above the line in a top-loading layout, even though other layouts are possible. The circles 41, 42, 43 show the boundaries of the respective working areas 51, 52, 53. For example the robot 31 can pick up or deposit an item inside the circular area 51 defined by said circle 41.

The robots share working areas 54, 55. The working area 54 is shared between the robots 31 and 32, whereas the working area 55 is shared between the robots 32 and 33.

The robots are each equipped with an end effector, for example a wrist, with gripping members, for example vacuum suction cups, according to a known art which is not essential for the purposes of this invention. Each of the robots can execute a picking mission, that is picking one or more items 10 from the conveyor 1, or a delivery mission, that is delivery of the (previously picked) items inside one of the containers 11 on the conveyor 2. The number and the arrangement of the items inside the containers 11 define the format.

The conveyors 1, 2 have a conveying direction A which in the example is the same, and defines a feeding side 6 and an opposite output side 7. The line receives the items 10 and the containers 11 from the side 6. Said items can be ordered or randomly arranged on the conveyor 1; the containers for example come from a box forming section and normally have a predetermined pitch (distance between each other). The line releases the containers 11 from the output side 7, each container being filled with one or more items 10, as shown, according to the format.

A line according to the invention is normally part of a packaging plant. The items 10 come from an upstream machine, for example a packaging machine or wrapping machine, etc.; their arrangement in an ordered manner or not depends on the upstream process. Empty containers come from a box-forming section; filled containers leaving the output side 7 are sent for example to a closing section. The line depicted in the figures can also be a stand-alone loading machine, also termed a loading isle.

The conveying direction A defines an upstream-downstream order, from the side 6 (upstream) towards the side 7 (downstream). In the figure for example the robot 32 is upstream the robot 31, and downstream the robot 33.

The items 10 represent the pickup points for the robots 31-33. The position of the items 10 on the conveyor 1 and, if appropriate, their spatial orientation and/or their type, can be detected with a known viewing system. Each of the containers 11 defines at least one delivery location (or several locations, according to the format).

The line comprises a control system for the robots 31-33 that acts as a manager of the missions of the robots. The control system stores a list (for example in a stack) of locations of the items 10 and containers 11 (and number of items already loaded in each container), and continuously allocates picking locations and delivery locations to said robots 31-33. As soon as a robot receives a pickup location or a delivery location from the control system, the robot generates and executes the related mission.

In order to manage the missions in the shared areas 54, 55, said control system operates with an algorithm that, before assigning to a robot a location in shared area, provides to dynamically redefine the area which is actually admissible for said robot, leaving out portions of shared working area where a mission of another robot is in progress, or has already been assigned.

For example it is now considered the allocation of a pickup or delivery location to the robot 32 in the working area 54, which is shared with the nearby robot 31. The algorithm comprises the following steps:

a) test for the existence of a mission assigned to the robot 31 in a location in the working area 54, and in the affirmative case dynamically redefining the working area of said robot 32 obtaining a new working area accessible to said robot 32 and not containing the location already assigned to the robot 31, b) if necessary, repetition of said existence test, for every robot of the line with shared working area, in the example the robots 31 and 33 both sharing a part of working area with the robot 32, obtaining a dynamically redefined working area of robot 32, c) allocation of a new picking or delivery location, respectively, to said robot 32, in a position belonging to said new and dynamically redefined working area.

If no location can be assigned in accordance with point c), the robot 32 remains in a momentary waiting state until the control system is able to assign it a location. When a (pick-up or delivery) location can be assigned to the robot 32, the algorithm is repeated if necessary.

Said accessible working area can be identical to the nominal working area, if no mission in the shared area is in progress. Otherwise, the area defined as accessible area will be smaller than the area 52 that can normally be reached by the robot 32, in particular leaving out at least one part of the shared portion 54 and/or 55 that is temporarily occupied by the robot 31 or 33.

As mentioned above, the modelling of the robots with a class including the list of nearby robots at risk of collision makes it easier to carry out the algorithm. Indeed, when a robot sends a request to the control system (manager), said system can apply the algorithm specifically to the robots close to the robot issuing the request. The programming details as well as the choice of the language, etc. are in any case not necessary for the purposes of the description of the invention, and they fall within the tasks of the man skilled in the art.

Figure 2:
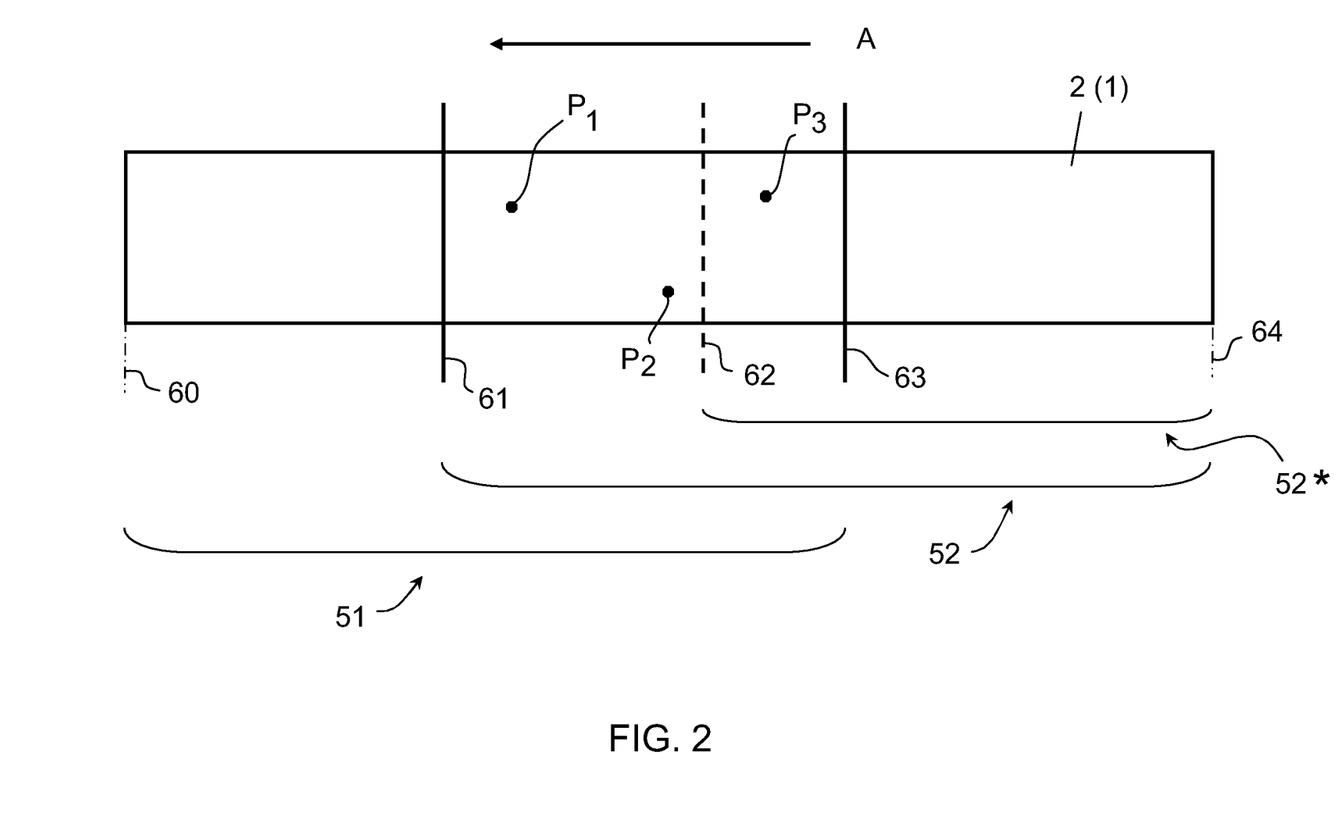
FIG. 2 is a detail of a conveyor of the line of FIG. 1, to schematically show the principle of dynamic reallocation of the working area of the robots.

FIG. 2 exemplifies the dynamic redefinition of a working area by means of said algorithm, in a preferred embodiment and with reference to a portion of a conveyor 2. However, the same example can refer to the picking missions from the conveyor 1.

Said FIG. 2 shows the nominal working areas 51, 52 of the robots 31 and 32, respectively. Said areas are defined by boundaries that, for the sake of simplicity, are represented as lines 60 to 64. Lines 60 and 63 are, respectively, the lower limit and the upper limit that can be reached by the robot 31; lines 61 and 64 indicate the lower limit and upper limit that can be reached by the robot 32. The lines 61 and 63 are the boundaries of the shared working area.

The control system calculates an optimal delivery location $P_1$ in the working area 52, to be assigned to the robot 32. The criteria for calculating said optimal location $P_1$ can vary (e.g. based on rules concerning distribution of load among the robots) and they are not essential for the invention. Since the point $P_1$ is located in the area shared with robot 31, the algorithm checks the state of said robot 31. In the example it is presumed that a delivery mission of robot 31 in a point $P_2$ is in progress. The algorithm consequently redefines the working area 52 of the robot 32, shifting the lower limit from the boundary 61 to a new boundary 62, and obtaining a new dynamically redefined working area 52*. In the example said new area 52* is smaller than the nominal area 52, so as to exclude the delivery point $P_2$ assigned to the robot 31. In other words said point $P_2$ is outside of the area 52* dynamically allocated to the robot 32.

At this point the algorithm seeks a new delivery location $P_3$ for the robot 32, preferably scanning the available locations from downstream to upstream (in a direction opposite to the direction A) relative to the earlier calculated optimal location $P_1$. Said location $P_3$ can be in the remaining portion of shared area, or in another generic point of the area 52*. If at least one location $P_3$ exists, that can be assigned to the robot 32, the manager assigns said location $P_3$ to the robot 32; otherwise the robot 32 is left in a waiting state.

It can be understood that the algorithm basically seeks to assign to a robot (in the example the robot 32) the most downstream available location, with respect to the conveying direction A, from an optimal location and in a manner compatible with tasks of the nearby robots, to avoid collision.

The boundaries 61-64 have been exemplified in FIG. 2 by lines, but can be more complex entities, for example curved lines or surfaces in a plane or in space.

A preferred embodiment also comprises a second algorithm named prediction algorithm. The prediction algorithm substantially gives priority to the robots that are located downstream with respect to the conveyance. For example, a pickup location or delivery location in the area 54, which is shared between the robots 31 and 32, is assigned with priority to the downstream robot 31 instead of upstream robot 32, if possible.

Said prediction algorithm preferably comprises the following steps:
  a) identifying a first location assignable to a generic first picking device, for example the robot 32, said mission being in working area 54 shared with another robot downstream, in the example the robot 31;
  b) verifying whether said location can be assigned to the downstream robot 31, i.e. whether said robot 31 is available to carry out the respective mission, and
  c) if said verification is positive, assigning said location to said downstream robot 31.

In step b) indicated above, the mission can be assigned to the robot 31 if said robot is free or if said robot 31 is carrying out a complementary mission. For example, a generic delivery mission M is considered assignable to the robot 31 if said robot is carrying out a pickup mission, because once the pickup mission is completed, the robot will have of course to deliver the item.

In this example, the prediction step provides that the delivery location is assigned to the robot 31 that, therefore, enjoys priority over the upstream robot 32. After the prediction, the assignment of the delivery location to the robot 32 will take into account the limitation that derives from the location assigned in advance to the robot 31. For example, the working area of said robot 32 will be dynamically recalculated as explained earlier.

Said prediction algorithm substantially has two advantages:

prevention of an upstream robot, in the example the robot 32, from occupying the location that can be assigned to a downstream robot, here the robot 31, in the case where the locations coincide, and also prevention of a downstream robot from having to wait for the end of a mission of an upstream robot before being able to deliver in a collision area.

Figure 3:
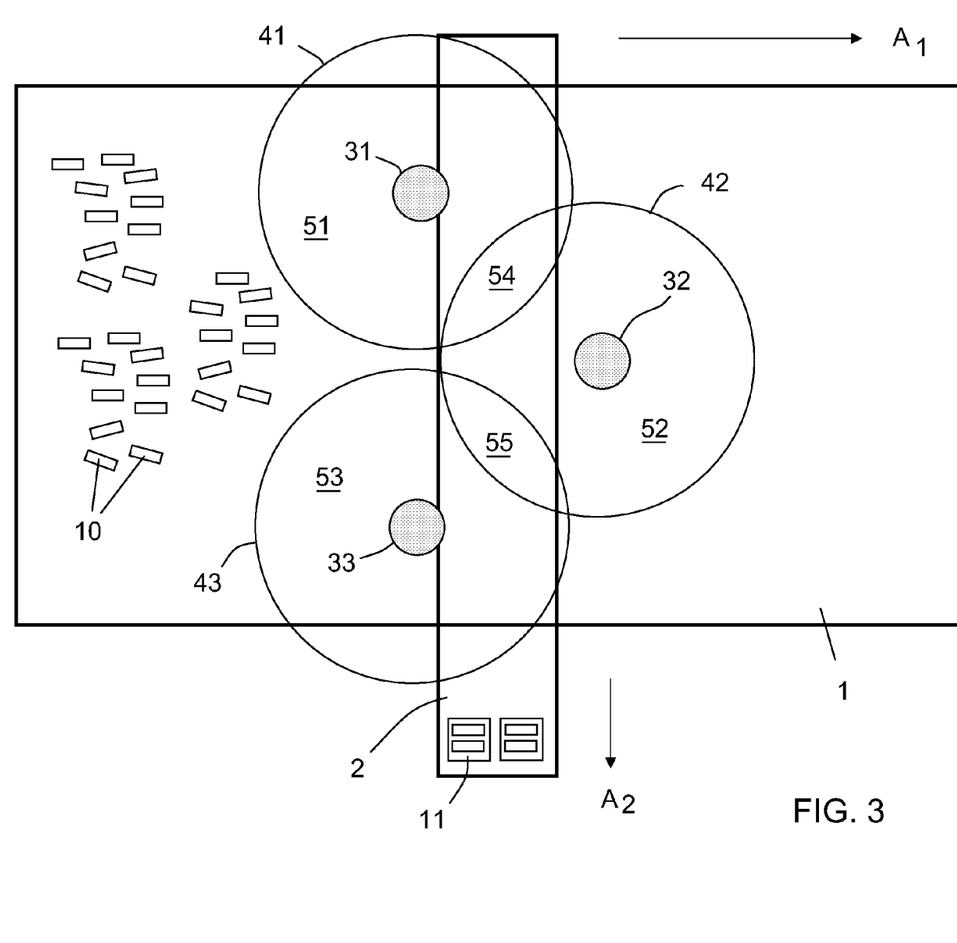
FIG. 3 provides another example of a packaging line, of the cross flow type, to which the invention can be applied.

FIG. 3 shows an alternative arrangement of the conveyors of the cross-flow type, where the conveyor 2 is arranged at 90 degrees relative to the direction of the conveyor 1. The conveying directions are indicated with the symbols A1, A2. It should be noted that the upstream-downstream order can depend on the reference conveyor, for example in FIG. 3 the robot 32 is located downstream of the robot 33 in the conveying direction A1 of the items, but the same robot 32 is upstream of the robot 33 according to the conveying direction A2 of the containers.

In a particularly preferred embodiment, the control system implements three rules in cascade. Said rules are defined as: 1) position control; 2) dynamic limits; 3) prediction. The position control rule is substantially a safety control that generates an anti-collision alarm; rules 2) and 3) respectively implement in a preferred manner the first and the second algorithm that have been described above.

A preferred example of said rules is now described with reference to the flow diagrams of FIGS. 4-6.

Rule 1—Position Control

Figure 4:
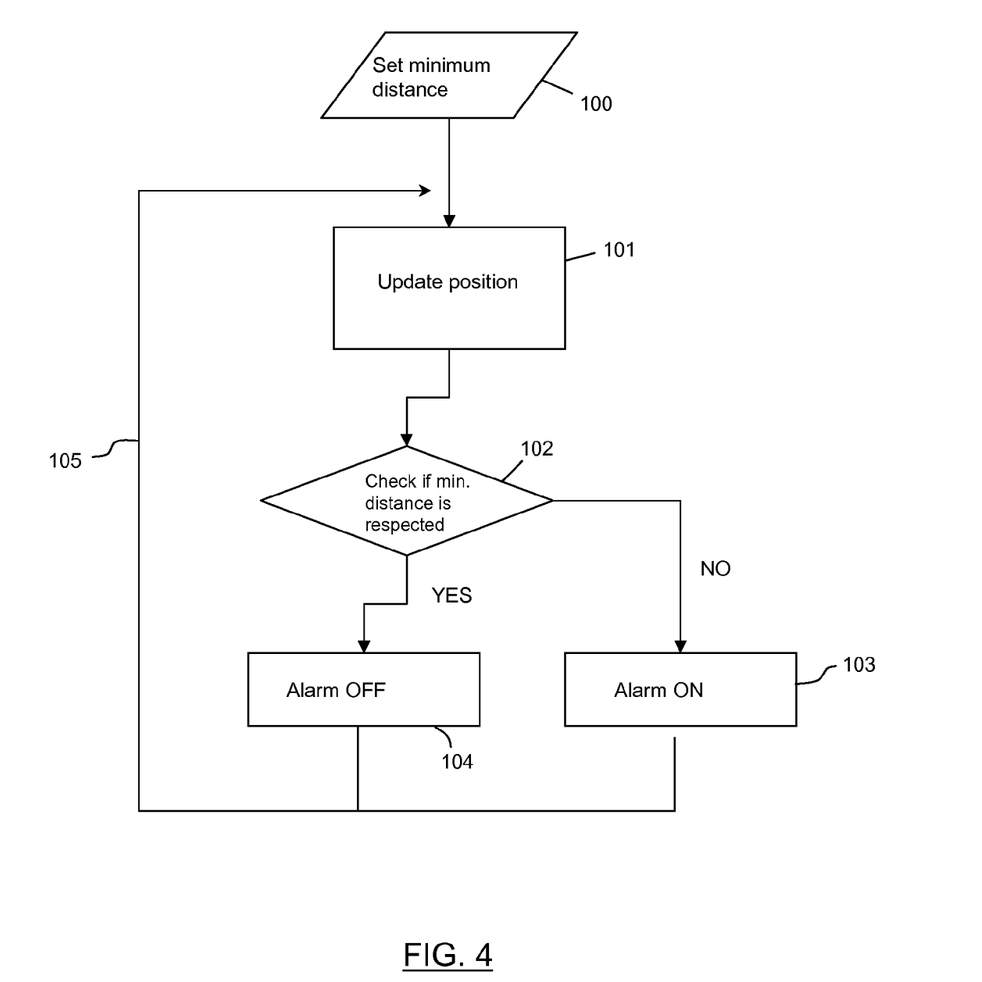
FIGS. 4, 5 and 6 are flow diagrams of algorithms able to be used to make the invention, according to a preferred embodiment.

The rule is advantageously implemented according to the flowchart of FIG. 4. The rule comprises the following steps.

Block 100: setting of a minimum distance between the robots.

Block 101: updating the location of the robots 31-33.

Block 102: checking that the minimum distance is respected. Said check can have a form such as:

$$\text{distance}(A,B) < X \text{ OR distance}(B,C) < X \text{ OR} \ldots$$

where A, B, ... denote the locations of the robots; the function distance (A, B) returns a distance between two locations and X indicates a minimum threshold distance.

According to the outcome of the check 102, the flow of the program determines the condition of collision alarm ON (block 103) or collision alarm OFF (block 104). The check is repeated continuously as indicated by the line 105.

Rule 2—Dynamic Limits

Figure 5:
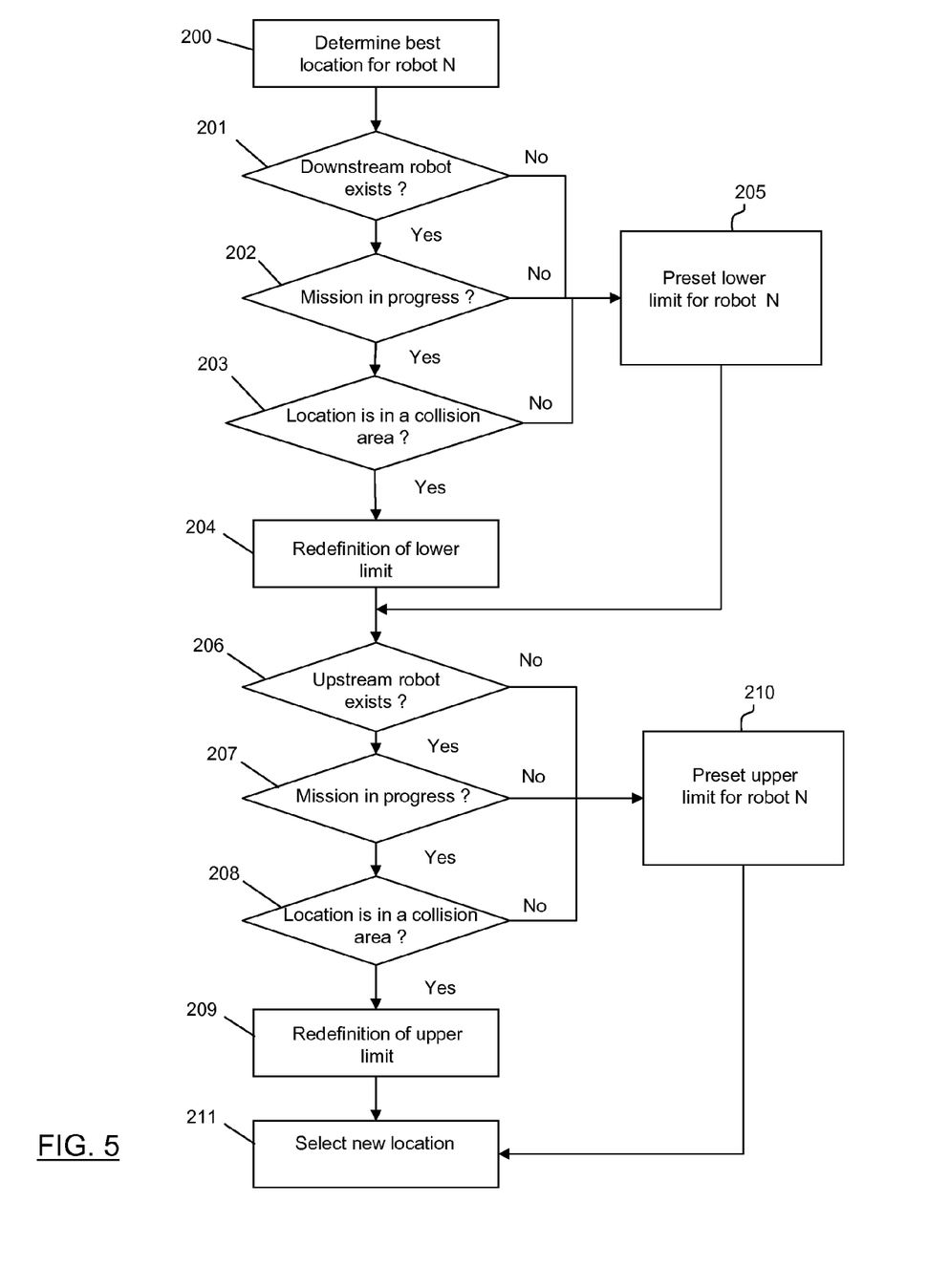

The rule is implemented according to the flowchart of FIG. 5.

Block 200 indicates the determination of an optimal pickup or delivery location for a generic N-th robot according to the order from downstream towards upstream, like the location $P_1$ of FIG. 2. The blocks 201, 202, 203 respectively check:
  whether there is a robot downstream (block 201),
  whether said robot has a mission in progress (block 202), and
  whether the respective working location is in the shared area (block 203).

If at least one of the three above tests is negative, execution goes to block 205 that keeps the boundary of the working area of the N-th robot unchanged. If, on the other hand, all three tests are positive, the algorithm (block 204) redefines the lower working limit of the robot.

A similar test is repeated for a possible upstream robot, as indicated by the blocks 206, 207, 208. The positive outcome of the tests leads the algorithm (block 209) to redefine the upper working boundary of the robot, otherwise (block 210) it remains unchanged.

Block 211 indicates the possible selection of another pickup or delivery location ($P_3$ in FIG. 2), going upstream and starting from the initial location $P_1$. Said block 211 is executed after block 209 or after block 210.

Rule 3—Prediction

Figure 6:
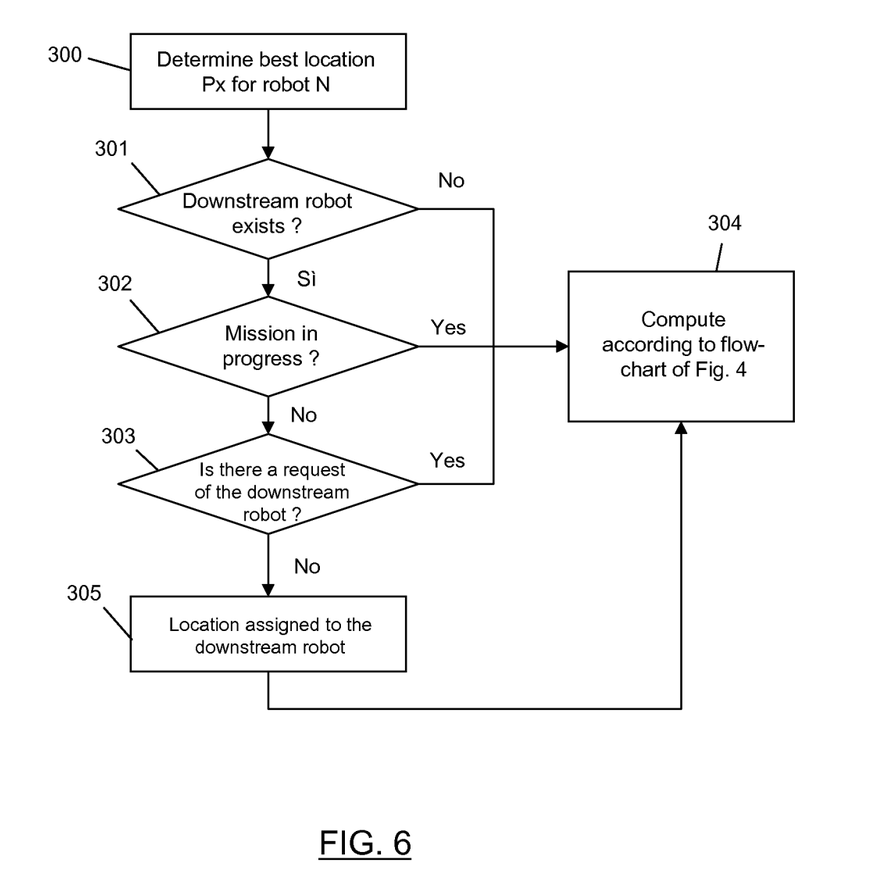

The rule is preferably implemented according to the flowchart of FIG. 6. Said rule has essentially the purpose of predicting the occupation of a downstream robot and to give said robot priority for assignment of an available location.

The chart of FIG. 6 as an example refers to the assignment of a delivery location. Block 300 indicates the determining of an optimal pickup or delivery location $P_X$ for a generic N-th robot.

The test in block 301 verifies whether, in the line, there is a robot downstream of said N-th robot. If there is no robot downstream, the processing moves on to rule No. 2 of FIG. 5 as schematically indicated by block 304. Said block 304 indicates the processing according to the flow chart of FIG. 5.

In case a (N−1)-th robot downstream of said N-th robot exists, the processing moves on the test blocks 302 and 303 that verify, respectively, whether said (N−1)-th robot has a delivery mission in progress or whether it has carried out at least one delivery request.

With reference to FIG. 1, for example, it is presumed that the N-th robot is the robot 32. Consequently, there is an (N−1)-th robot farther downstream, represented by the robot 31, i.e. the test 301 gives a positive outcome.

Blocks 302 and 303 verify the state of occupation of the robot 31. If both have a negative outcome, the earlier calculated location $P_X$ relative to the robot 32 (block 300) could be in collision with the location that can subsequently be assigned to the robot 31. Indeed, said robot 31 is free or is engaged in a pickup mission. Therefore, the robot 31 is available to carry out a delivery mission immediately after the pickup.

The algorithm "books" the assignment of the delivery location of the robot 31 (block 305), i.e. before receiving the relative "request" from the robot, thus making a "prediction" of the work of said robot 31. After the prediction, the assignment of the delivery location to the robot 32 upstream (block 304) will take into account the limitation represented by said location $P_X$ assigned in advance to the robot 31.

In other words the order in which the instructions of the prediction algorithm are carried out is as follows. Let $R_A$ and $R_B$ be two robots with $R_B$ located downstream of $R_A$. Suppose that the robot $R_B$ requests a location to deliver an item. Since the robot $R_B$ is arranged downstream of $R_A$, the delivery location for the robot $R_B$ is calculated (with consequent limitation of the shared area) and then the delivery location of the robot $R_A$ is calculated, which will be located in the free area.

The prediction algorithm operates in a totally analogous way to assign a pickup location instead of a delivery location.

The invention claimed is:

1. A method for anti-collision control and assignment of missions to picking devices of a packaging line, the method comprising:
   providing a packaging line including:
   at least a first linear conveyor for inlet of items;
   at least a second linear conveyor for outlet of items;
   a plurality of picking devices, each of the picking devices being suitable to perform missions for picking items from the first linear conveyor and missions for delivery items in predetermined locations on the second linear conveyor or inside containers transported by the second linear conveyor;
   wherein each of the picking devices has a respective working area comprising a region of the first linear conveyor and a region of the second linear conveyor accessible to the respective picking device;
   wherein the picking devices are arranged to operate with shared working areas so that there is at least one region of the first and/or second linear conveyor belonging to the working areas of at least two of the picking devices;
   wherein the first linear conveyor and the second linear conveyor has a substantially linear extension along a respective direction, and having an orientation defined by a conveying direction, thus defining an upstream-downstream oriented direction; and
   wherein the picking devices and the respective picking or delivery locations on the first and second linear conveyors are identifiable by a control system as organized according to the oriented direction;
   assigning, via an algorithm, a pickup location or a delivery location to a generic first picking device including:
   a) verifying the existence of a pickup or delivery location already assigned to a generic second picking device and in a working area shared between the second picking device and the first picking device and, in the affirmative case, dynamically redefining the working area of the first device obtaining a new working area accessible to the first device, such that the location assigned to the second device is outside of the new and redefined working area;
   b) if necessary, repeating the acts of verifying for every one of the picking devices sharing a working area with the first picking device, and obtaining a dynamically redefined accessible working area for the first picking device; and
   c) assigning to the first picking device a respective pickup or delivery location belonging to the accessible working area, if there is at least one pickup location or delivery location in the area that can be assigned to the first picking device.

2. The method according to claim 1, wherein assigning, via an algorithm, a pickup location or a delivery location to a generic first picking device includes:
   identifying a preferred pickup or delivery location, inside the working area of the generic first picking device;
   dynamically redefining the working area of the first picking device according to at least the acts a) and b) to obtain an accessible working area; and then
   assigning the preferred pickup or delivery location to the first picking device, if the location is included in the accessible working area; or
   looking for a new available pickup or delivery location inside the accessible working area, and assigning the new location, if existing, to the first picking device.

3. The method according to claim 2, wherein assigning, via an algorithm, a pickup location or a delivery location to a generic first picking device includes seeking a new pickup location or delivery location assigning the first picking device the location farthest downstream among those available in the accessible area.

4. The method according to claim 3, wherein assigning, via an algorithm, a pickup location or a delivery location to a generic first picking device includes seeking a new pickup location or delivery location starting from the preferred location and scanning other available locations by advancing in the upstream direction as defined by the respective conveyor.

5. The method according to claim 1, further comprising giving priority to assignment of pickup or delivery locations, via an algorithm, to the downstream picking devices, wherein giving to priority assignment includes operating so that a pickup or delivery location, in a generic shared area, is assigned with priority to the picking device that is farthest downstream among the devices that have access to the shared area.

6. The method according to claim 5, wherein the giving priority to assignment of pickup or delivery locations, via an algorithm, to the downstream picking devices includes:
   identifying a preferred pickup or delivery location for a generic first picking device;
   verifying the existence and the state of occupation of at least one second picking device that is located downstream of the first device and that share a working area with the first device;
   assigning the preferred location to the second device, if compatible with the earlier verified state of occupation of the same, and then dynamically redefining the accessible working area for the upstream first device.

7. The method according to claim 1, further comprising generating a collision alarm, via a position control algorithm, if the distance between any one of the picking devices and the other one of the picking devices or other component of the packaging line, falls below a predetermined threshold value.

8. A packaging line, comprising:
   at least a first linear conveyor for inlet of items;
   at least a second linear conveyor for outlet of items;
   a plurality of picking devices, each of the picking devices being suitable for carrying out missions for picking items from the first conveyor and delivery missions for delivering items in predetermined locations on the second conveyor or inside containers transported by the second conveyor;
   a control system for anti-collision control and for assigning missions to the picking devices;
   wherein each of the picking devices has a respective working area comprising a region of the first linear conveyor and a region of the second linear conveyor accessible to the respective picking device;
   wherein the picking devices are arranged to operate with shared working areas;
   wherein the first linear conveyor and the second linear conveyor have a substantially linear extension along a respective direction, and having an orientation defined by a conveying direction, defining an upstream-downstream oriented direction;
   wherein the picking devices and the respective picking or delivery locations on the first and second linear conveyors are identified by the control system as arranged according to the oriented direction; and
   wherein the control system is configured to operate with an algorithm that assigns a pickup location or delivery location to a generic first picking device, through at least the following acts:
      a) verifying the existence of a grasping or pickup location already assigned to a generic second picking device, and in a working area shared between the second picking device and the first picking device, and in the affirmative case dynamically redefining the working area of the first picking device obtaining a new working area accessible to the first device, such that the grasping or pickup location assigned to the second picking device is outside of the new redefined working area;
      b) if necessary, repeating the acts of verifying for every one of the picking devices having a working area shared with the first picking device and obtaining a working area accessible to the dynamically redefined first picking device; and
      c) assigning a respective pickup or delivery location belonging to the accessible working area to the first picking device, if there is at least one pickup or delivery location in the area that can be assigned to the first picking device.

9. The packaging line according to claim 8, wherein the first linear conveyor and the second linear conveyor are substantially parallel, with the same conveying direction in co-current, or with an opposite conveying direction in counter-current.

10. The packaging line according to claim 8, wherein the first linear conveyor and the second linear conveyor have a substantially perpendicular direction, with a cross-flow conveying direction.

11. The packaging line according to claim 8, wherein the picking devices are robots with at least two degrees of freedom, and preferably delta robots.

12. The packaging line according to claim 11, wherein the robots include delta robots.

* * * * *